United States Patent [19]

Bryne

[11] Patent Number: 5,325,738
[45] Date of Patent: Jul. 5, 1994

[54] LOCKING MECHANISM FOR A CLIPLESS BICYCLE PEDAL

[76] Inventor: Richard M. Bryne, 2172 Pine St., San Diego, Calif. 92103

[21] Appl. No.: 947,350

[22] Filed: Sep. 18, 1992

Related U.S. Application Data

[63] Continuation-in-part of Ser. No. 804,070, Dec. 9, 1991, abandoned.

[51] Int. Cl.$^5$ ............................................. G05G 1/14
[52] U.S. Cl. ..................................... 74/594.6; 36/131; 403/326; 403/329; 403/349
[58] Field of Search ..................... 74/594.4, 594.6; 36/131, 132; 403/326, 329, 348, 349

[56] References Cited

U.S. PATENT DOCUMENTS

| | | | |
|---|---|---|---|
| 590,685 | 9/1897 | Matthews | 36/131 X |
| 2,588,609 | 3/1952 | Blackhall | 403/348 X |
| 3,215,180 | 11/1965 | Braun | 403/348 X |
| 3,471,186 | 10/1969 | Luebbert et al. | 403/197 |
| 3,964,343 | 6/1976 | Lauterbach | 74/594.6 |
| 4,298,210 | 3/1981 | Lotteau et al. | 280/259 |
| 4,685,351 | 8/1987 | Pegg | 74/594.4 |
| 4,803,894 | 2/1989 | Howell | 74/594.6 |
| 4,827,633 | 5/1989 | Feldstein | 36/131 |
| 4,864,887 | 9/1989 | Rapisarda | 74/594.6 |
| 4,898,063 | 2/1990 | Sampson | 74/594.4 |
| 4,936,164 | 6/1990 | Forké74 | 594.6/ |
| 4,942,778 | 6/1990 | Bryne | 74/594.6 |
| 5,046,382 | 9/1991 | Steinberg | 74/594.6 |

FOREIGN PATENT DOCUMENTS 3315282 4/1983 Fed. Rep. of Germany .

OTHER PUBLICATIONS

"Das Bryne-Pedal Von Speedplay: Neue Freiheit Auf Dem Rund-Klotz", Rad Magazin Tour, (German) Oct. 1992.
"A Prototype With Promise", Bicycling, Apr. 1991.
"What's Hot—Compact Disc", John Derven, Bicycle Guide, Jun. 1992.
"New Products—Lollipop Pedals", Bicycling Staff, Bicycling, Jul. 1992.
Triathlon Today, Dec. 1992/Jan. 1993, p. 41.
"Cyclex—Speedplay Bryne-Pedal", Triathlete, May 1992.
"Bryne X/2 Pedal by Speedplay", Tom Demerly, Triathlon Today, May 1992.
"Bryne Speedplay Pedal System", Cycle Plus, Jun. 1992 (England).
"Speedplay", Bicycle Retailer & Industry News, Jan.-/Feb. 1992,
"Pedals put new spin on weight and efficiency", Lennard Zinn, VeloNews Jun. 22, 1992.
"New Trader Products", Bicycle Trader, Jun. 1992.

*Primary Examiner*—Allan D. Herrmann
*Attorney, Agent, or Firm*—Brown, Martin, Haller & McClain

[57] ABSTRACT

The clipless pedal system for mountain bikes or other bicycles comprises a generally circular pedal body, at least one side of which has a mushroom or T-shaped extension which is created by either forming a larger diameter head over a small diameter neck or by forming grooves or slots in the extension slightly below its top, with the grooves being the equivalent of the neck. The cleat consists of a mounting plate which can be attached to the sole of mountain biking shoe, and has a generally open interior of sufficient dimensions to permit insertion of the head therein. Engaging means extend inwardly at a spacing corresponding to the head of the extension. The engaging means can be inserted into the neck of the extension to catch just below the head of the extension. One or more spring tabs may be used to releasably lock the cleat and pedal extension together once the head is in position with respect to the engaging means.

20 Claims, 5 Drawing Sheets

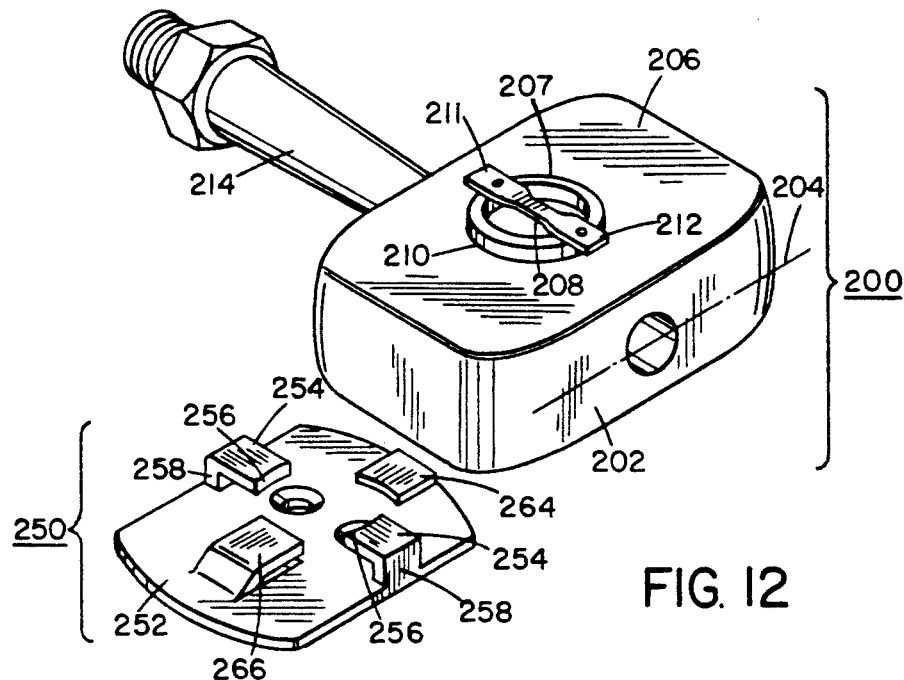
FIG. 12
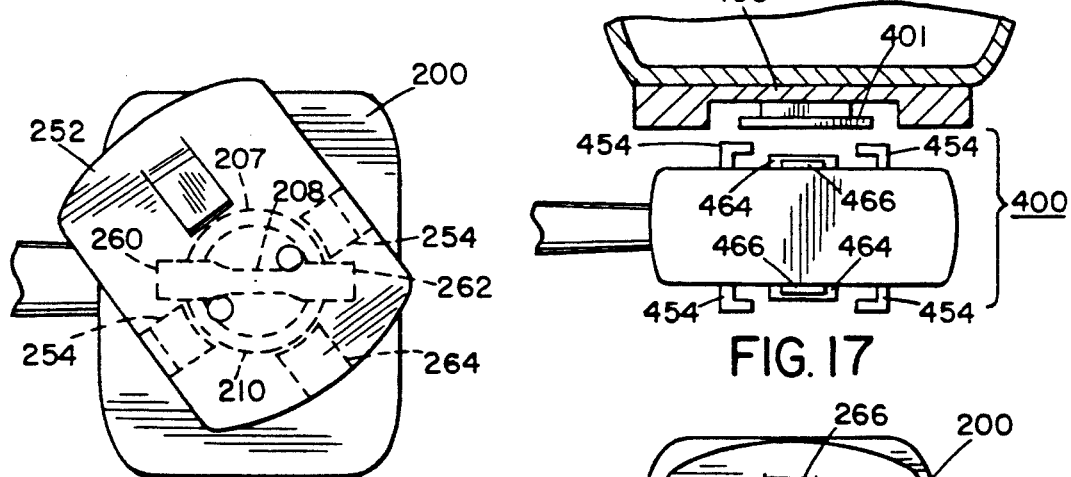
FIG. 13a
FIG. 17
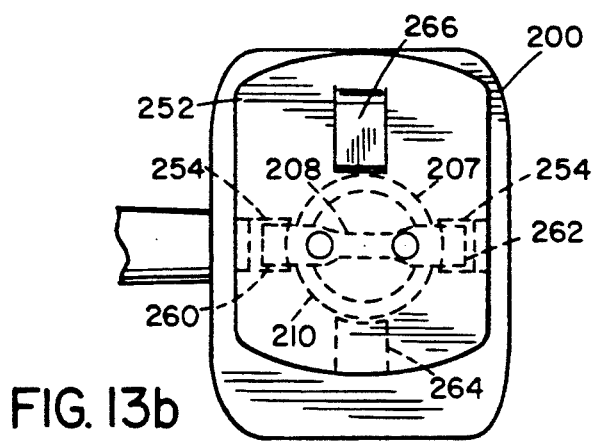
FIG. 13b

LOCKING MECHANISM FOR A CLIPLESS BICYCLE PEDAL

RELATED APPLICATIONS

This is a continuation-in-part of application Ser. No. 07/804,070, filed Dec. 9, 1991, now abandoned.

BACKGROUND OF THE INVENTION

Mountain bikes have overtaken road bikes in popularity over the past few years, with sales of mountain bikes exceeding those of road bikes 4 to 1. However, advanced equipment to improve speed and pedalling efficiency is still primarily available only for road bikes. With the exception of lightweight composites and high-tech metals to decrease the overall weight of the bicycle, the single most significant improvement in bicycle accessories is the clipless pedal.

Clipless pedals have been available for road bikes, both for racing and touring, for many years. They provide increased comfort and decreased weight as compared with old style bicycle clips and pedals. Several disadvantages of prior clipless pedal systems were eliminated by the clipless pedal system disclosed in U.S. Pat. No. 4,942,778 issued Jul. 24, 1990 to the present inventor. One of the major disadvantages of earlier pedals was that the locking mechanism was in the pedal itself, limiting engagement of pedal and cleat to only one side of the pedal. As disclosed in the '778 patent, the locking mechanism is in the cleat which attaches to the sole of the shoe such that the mechanism is recessed and, thus, protected from damage.

Mountain biking introduces additional concerns beyond those for road bikes. The pedal bodies themselves are broader because they must bear a considerable amount of stress and strain when riding in rough terrain and during sudden changes of direction. Also, dirt and debris can build up on the pedals and in the cleats when riding off-road, so considerations must be made to avoid jamming the locking mechanism so that it will not engage or disengage when desired. Finally, because a rider may wish to leave his or her feet free when riding in rough terrain, it may be preferable to provide for a choice between locking the cleat and pedal together and riding "unattached". Thus, in a race situation, for example, the rider could be locked in when riding in areas where the course is predictable to achieve maximum pedalling efficiency, then release the pedals when he or she wants to be sure that a foot will be available to push off of an obstacle, to pivot in a sudden turn or to prevent a fall.

SUMMARY OF THE INVENTION

An object of the present invention is to provide a clipless mountain bike pedal system which is sturdy enough to meet the rigorous demands of mountain biking yet is easy to use.

Another object of the present invention is to provide a cleat for use with clipless mountain bike pedals which is easy to engage and disengage and is resistant to effects of dirt or debris which might otherwise damage or incapacitate a locking mechanism.

Still another advantage of the present invention is to provide a cleat for use with clipless pedals which is small enough to be substantially retained within the recessed area in the soles of commercially-available mountain bike shoes so that it is generally protected from impact and does not interfere with walking or pedalling a flat pedal.

Yet another advantage of the present invention is to provide a clipless pedal for mountain bikes which can be made with either one side or two sides which can engage the cleat.

In an exemplary embodiment, the clipless pedal system for mountain bikes comprises a generally circular pedal body, at least one side of which has a mushroom or T-shaped extension which is created by either forming a larger diameter head over a small diameter neck or by forming grooves or slots in the extension slightly below its top, with the grooves being the equivalent of the neck. In either case, a head is formed which will be used to engage the cleat. The cleat consists of a mounting plate which can be attached to the sole of mountain biking shoe, preferably within a recessed area, and has a generally open interior of sufficient dimensions to permit insertion of the head therein. Engaging means extend inwardly (laterally) at a spacing corresponding to the head of the extension. The engaging means can be inserted into the neck of the extension to catch just below the head of the extension. One or more spring tabs may be used to releasably lock the cleat and pedal extension together once the head is in position with respect to the engaging means. In one embodiment, the inwardly extending engaging means are made of a resilient material so that separate spring tabs are not required.

In a first embodiment of the pedal system, the head of the pedal extension is a plate of predetermined thickness which is generally rectangular with rounded ends. The head is disposed on the neck at an angle to a line parallel to the spindle on which the pedal is mounted. The angle corresponds to the amount of rotation necessary to engage and disengage the cleat and pedal. The corresponding cleat has L-shaped rails extending downward from a mounting plate, i.e., a downward extension with a lateral extension at its lower edge. The spacing of the lateral extensions of the rails matches the narrowest dimension of the head (between the two flat sides) to permit insertion of the head into the space between the rails when the rider's foot is rotated at the predetermined angle. Return of the rider's foot to normal riding position catches the corners of the head within the rails. By sliding the head toward the rearmost position in the cleat, a spring flap in the cleat plate pops out near the front-most portion of the head and locks it in place. Alternately, the head can be inserted into the rails at their front ends, then slid rearward until the spring flap locks the head in place. In each case, for disengagement, the rider's foot is rotated until the flat sides of the head are parallel with the rails, and the foot can be pulled away, releasing the hold on the head.

In a second embodiment, the head is substantially rounded, however, it may also be flattened on two sides. A pair of spring loaded tongues or wires are mounted in the cleat and provide inward-directed forces. When the pedal extension is inserted into the space between the spring-loaded devices they expand to slide over the head then resile inward to catch the neck. The grooves or other means by which the head is formed do not continue fully around the neck's diameter. The limited capture area permits release of the spring-loaded devices by rotating the rider's foot until the devices are out of the groove (or out from under the head) allowing the rider to lift his/her foot to release the pedal.

A third embodiment provides an add-on pedal extension to existing pedals so that the same cleat and engaging means as in the prior embodiment of the invention can be used.

A fourth embodiment is similar to the first embodiment in that the head is rectangular, forming a T-shaped extension, however, the rectangle is relatively narrow such that two tabs extend in opposite directions from the supporting neck, and the head is parallel to the pedal spindle. The tabs are slightly rounded, as in the first embodiment. The tabs can be inserted and locked into place by two methods. The first is to slide the tabs into the rails of the cleat by bringing the cleat in contact with the head then sliding the foot (the cleat) forward to engage the tabs within the L-shaped rails of the cleat. When the foot is moved fully forward to the point where the front of the neck hits a stop on the cleat and a spring flap pops up to catch the back of the neck. The pedal and cleat can also be engaged by aligning the head of the pedal with the cleat when the rider's foot is at an angle such that the ends of the tabs are situated between the rails. By rotating the rider's foot back to a generally perpendicular line with respect to the pedal spindle, both tabs will slide within the L-shaped rails. If the foot is not already fully forward, the foot is moved forward until the stop contacts the neck and the spring tab pops up.

The locking mechanism of the first and fourth embodiments is interchangeable between the pedal and the cleat. Specifically, the L-shaped rails can be located on the pedal and the head/neck extension can be located on the cleat. Since there is no complicated mechanical spring-activated mechanism involved in either half of locking mechanism it is lightweight and does not require a large pedal or cleat. For example, rails as described above can be placed on both sides of the pedal without a significant weight or size increase, and the extension can be substantially recessed within the sole of the rider's shoe so that it does not affect the rider's ability to walk while wearing the shoes to which the cleat is attached.

The locking mechanisms herein described are applicable to any number or releasable attachment applications and are not limited to use on clipless bicycle pedals. The locking mechanism provides easy engagement, a durable attachment which allows a limited amount of relative motion and easy disengagement by rotation on one-half of the fastener with respect to the other.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which:

FIG. 12 is a perspective view of a fourth embodiment of the locking mechanism on a pedal/cleat combination;

FIG. 13a is a top view of the locking mechanism in an unlocked position and FIG. 13b is a top view of the locking mechanism of FIG. 12 in a locked position;

FIG. 17 is a side view of the pedal/cleat combination with a reversed location of the extension and rails.

DETAILED DESCRIPTION OF THE PREFERRED EMBODIMENTS

The pedal body is a generally flat block which may have any shape which will provide enough surface area in a single plane for reasonable disbursement of the force placed on the pedal by the rider's foot. In the embodiments illustrated in FIGS. 1, 2, 3, 4 and 8 the pedal is a ring with plate spanning its interior and connecting the right to the extension which is one-half of the locking mechanism. The plane 13 at which the sole of the shoe contacts the pedal, indicated in FIGS. 2, 7, and 8 lies across the upper (or lower) surface of the ring, the ring being symmetrical when its width is bisected along a plane running through the center of the ring's width and parallel to the plane of contact.

In FIGS. 12–17, the pedal body is a block which may be solid throughout or a closed structure with a partially hollow interior. The sole of the rider's shoe contacts the upper (or lower) surface, the block being symmetrical top to bottom. The block may have squared or rounded edges, and may have beveled corners.

While the pedal is described as having its top and bottom as the broadest planes of the block, it should be understood that the pedal rotates around the spindle and may not be oriented with the contact planes running completely horizontal, especially if the rider's foot is not engaged. Nonetheless, references to top, bottom, front, back and sides shall be described as if the rider's foot is engaged and the sole of the rider's shoe contacts and is parallel to the top of the pedal.

The locking mechanism is disposed on an extension which is located at the diametric center of the pedal body. In the first embodiment, the extension is T-shaped or mushroom shaped, where such a shape is created by either forming a first larger diameter head over a smaller diameter neck (referred to as the "third diameter"), or by forming grooves or slots in a base which protrudes above the contact plane of the pedal so that a head is defined above the grooves, and the grooves or slots become the equivalent of the neck with a second, smaller diameter.

Figure 8:
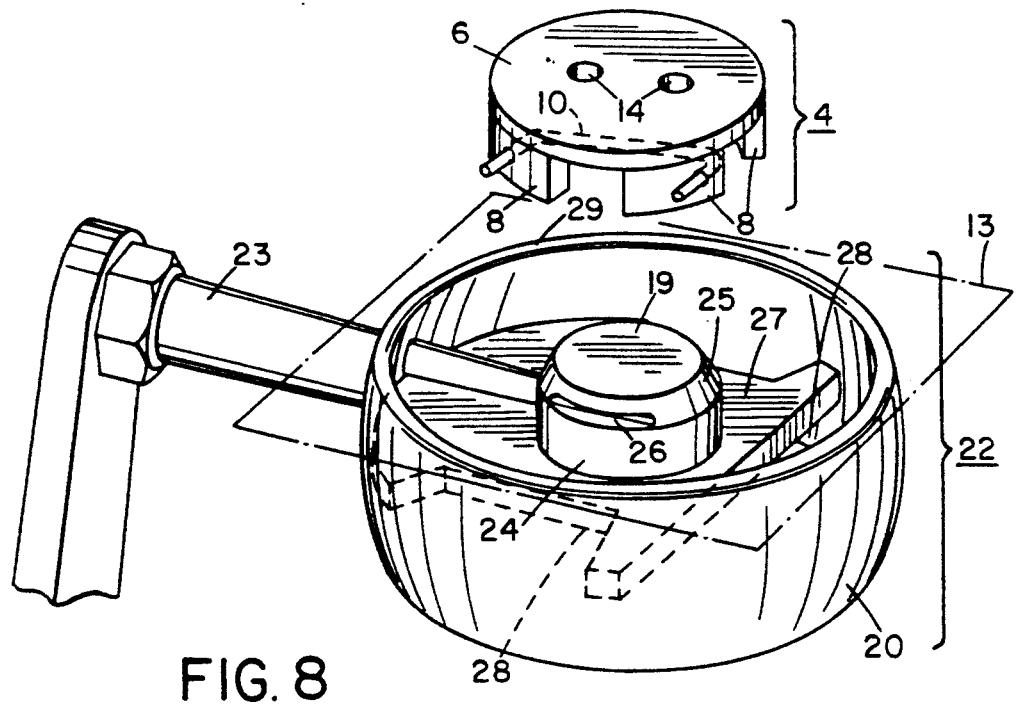
FIG. 8 is a perspective view of the pedal and cleat.

As illustrated in FIG. 8, the first embodiment of the clipless mountain bike pedal system consists of two primary components: pedal 22 and cleat 4. Pedal 22 is illustrated in detail in FIGS. 1-3.

Figure 1:
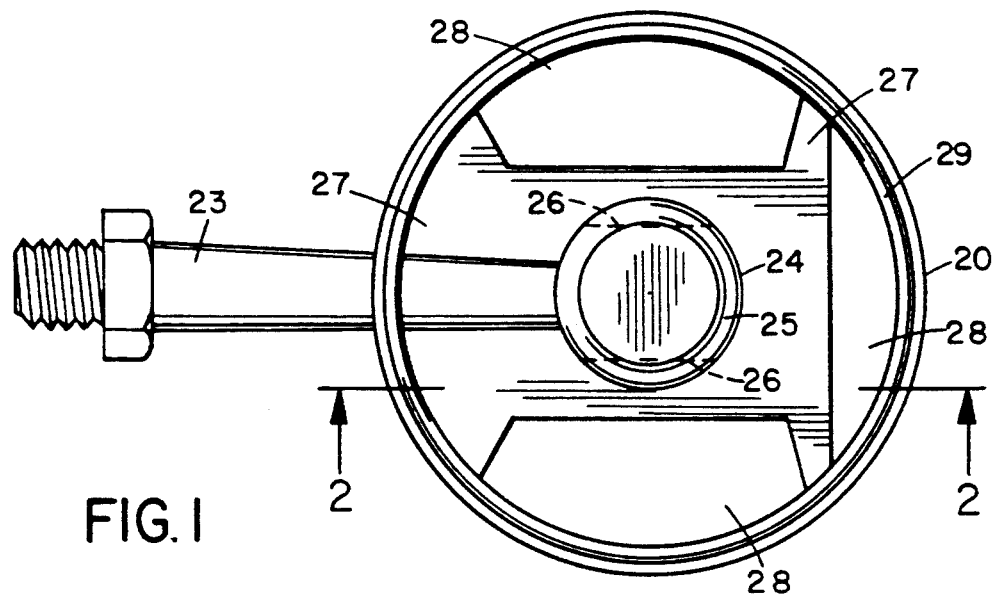
FIG. 1 is a top plan view of a mountain bike pedal according to the present invention.
Figure 2:
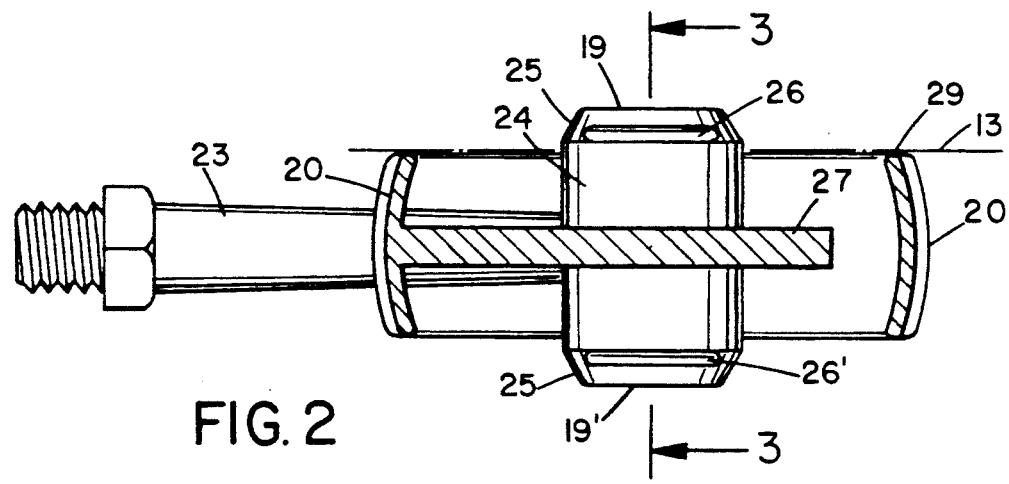
FIG. 2 is a cross-sectional view taken along line 2—2 of FIG. 1.

Pedal 22 is generally circular in shape with a ring 20 centered on a cylindrical extension 24. Joining ring 20 to extension 24 is plate 27 which intersects both ring 20 and extension 24 at their approximate lateral centers, as shown in FIG. 2. The height of extension 24, from 19' to 19, is greater than the width of ring 20 so that it extends somewhat higher than the rim 29 of ring 20 to facilitate insertion in to cleat 4.

Formed in the circumferential sides of extension 24 are grooves 26 which lie in a plane parallel to plate 27. Generally, two grooves 26 of a finite length are placed so that they are diametrically opposite each other. It is possible to use more grooves in an equally-spaced relationship, e.g., three grooves at 120° spacings. As illustrated in each of the figures, two grooves 26 are located at the leading and trailing edges of extension 24. It is also possible to locate the grooves 26 at the inner side and outer side of extension 24 relative to the spindle 23 as long as the cleat is similarly oriented.

Figure 7:
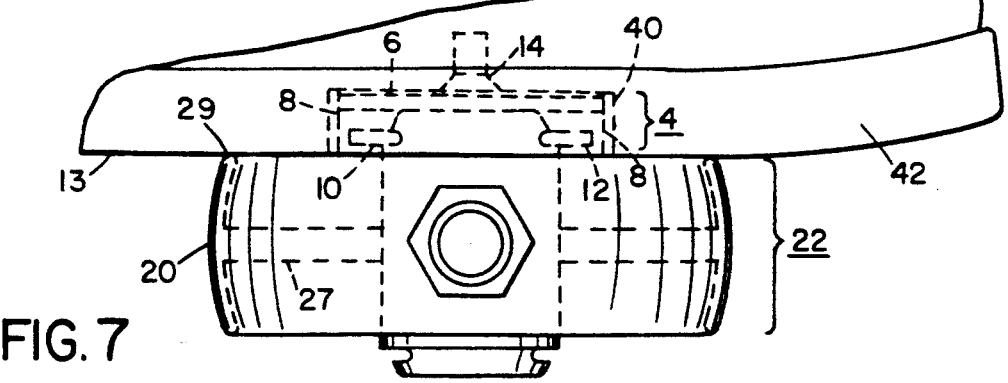
FIG. 7 is a side view of a rider's shoe with the cleat attached and the pedal engaged with the cleat.

Cleat 4 has a flat plate 6 by which it is mounted via screw holes 14 within the recessed area 40 of sole 42, which is commonly available in mountain bike shoes, as shown in FIG. 7. Attached perpendicular to plate 6 are extension tabs 8 which are separated by a first spacing. Extension tabs 8 (for reference, the "first extension") retain spring wires 10 and 12 (for reference, the "second extension") so that they span the interior cavity 50 of cleat 4 at a second spacing smaller than the first spacing. A latching mechanism can be used in place of the spring wires 10 and 12. Anything that can provide releasable engagement with the grooves will serve the same purpose as the spring wires 10 and 12. For example, there are multiple latching mechanisms disclosed in U.S. Pat. No. 4,942,778.

Figure 5:
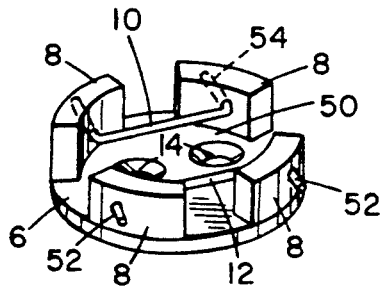
FIG. 5 is a perspective view of a first embodiment of the cleat of the present invention.

FIG. 5 illustrates the details of cleat 6. Flat plate 4 is shown as circular, but its shape is not critical except to the extent that it must fit within recessed area 40. The size of cavity 50 is determined by the diameter of extension 24 of the pedal. The upper portion of extension 24 must fit within cavity 50 so that grooves 26 which have a second thickness can be engaged by spring wires 10 and 12 to lock the pedal and cleat together. The length (for reference, the "first height") of tabs 8 are sufficient to retain spring wires 10 and 12 at a distance from plate 6 so that tops 19 or 19' of extension 24 are generally in contact with plate 6 when the pedal and cleat are engaged.

Tops 19 or 19', however do not bear the entire weight of the rider, nor do the spring wires 10 and 12. The relative heights of extension 24 and ring 20 are such that when the pedal and cleat are engaged, the sole 42 of the rider's shoe contacts the rim 29 of ring 20, so that the rider's weight is distributed over the ring 20.

The top portions of extension 24 have a chamfer 25 which assists in centering the extension 24 within the cleat 4. Once the two elements are centered, the chamfer 25 gradually spreads the spring wires 10 and 12 until they resile into grooves 26 to lock the pedal to the cleat.

Figure 3:
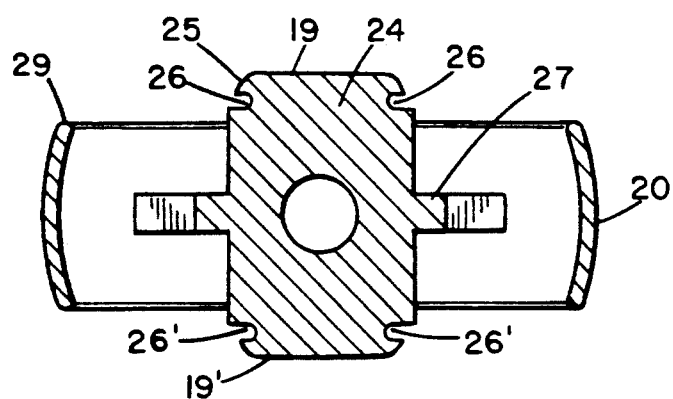
FIG. 3 is a cross-sectional view taken along line 3—3 of FIG. 2.

The pedal embodiment illustrated in FIGS. 2 and 3 has a symmetrical construction so that either side of the extension 24 can be inserted into cleat 4 thereby engaging either grooves 26 or 26' with spring wires 10 and 12.

Figure 4:
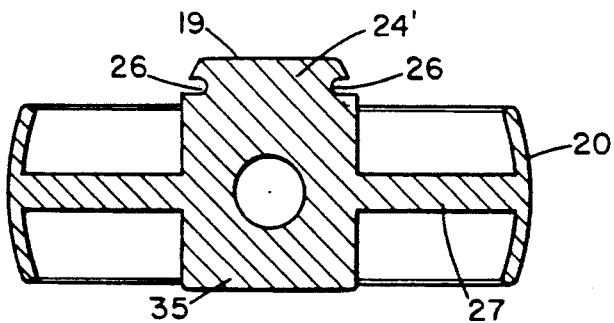
FIG. 4 is a cross-sectional view similar to that of FIG. 3 illustrating an alternate embodiment.

FIG. 4 illustrates an alternate one-sided pedal which permits the rider to choose between locking the cleat into grooves 26 or letting the feet remain free by using side 35 for pedalling. Such an option may be desirable to prevent falling or injury from sudden obstacles or hazards. Also, when a mountain bike is being ridden in traffic, it may be desirable to leave at least one foot free to allow rapid response to sudden stops or turns by cars or other bikes.

Figure 9:
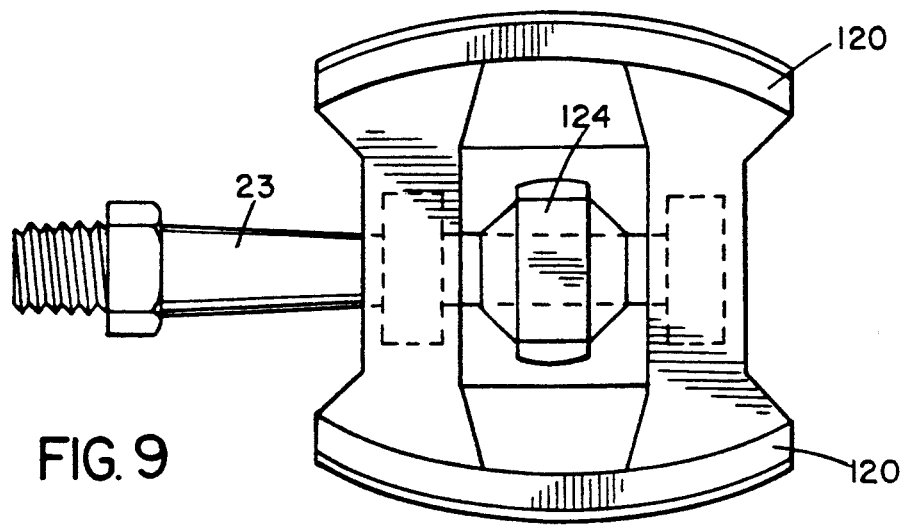
FIG. 9 is a top plan view of an alternate pedal configuration.

The ring 20 is curved slightly inward at the rim 29, and rim 29 is rounded. This reduces the chance of injury if the rider slips on the pedal or hits the pedal against his or her leg. The circular configuration of the pedal 22 and its rounded edges are not essential to the successful function of the locking mechanism described herein. These features are merely included as a desirable feature of a mountain bike pedal. FIG. 9 illustrates a possible configuration in which both extension 124 and ring 120 are squared off.

Figure 6A:
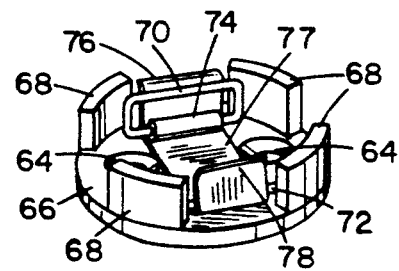
FIG. 6a is a perspective view of a second embodiment of the cleat and FIG. 6b is a side view of the cleat of FIG. 6a engaged with the pedal.
Figure 6B:
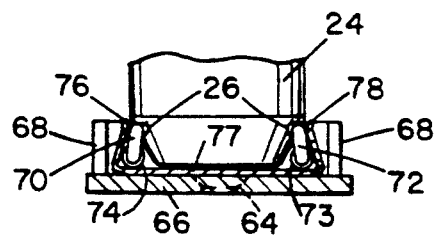

A second embodiment of the cleat is illustrated in FIGS. 6a and 6b. Plate 66 is similar to plate 6 of the first embodiment in that it provides means for mounting the cleat on the shoe sole 42. Tabs 68 provide support for the mechanism. Links 70 and 72 are metal "rings" which are held down to plate 66 by channels 74 and 73, respectively, so that links 70 and 72 pivot within the channels. A spring plate 77 spans plate 66 and has arms 76 and 78 which extend slightly inward from perpendicular to plate 66 to press against links 70 and 72 to provide an inward compression, urging links 70 and 72 toward the center of the cleat. When body 24 of pedal 22 is inserted into the cleat, it presses outward on links 70 and 72 to overcome the inward compression of the spring arms 76 and 78. Once grooves 26 are aligned with the upper legs of links 70 and 72, spring arms 76 and 78 cause the links 70 and 72 to lock the pedal in place. Spring plate 77 may be made of spring metal or any resilient plastic or polymer.

Both plates 6 and 66 are shown with mounting holes 14 and 64, respectively. Standard commercially-available mountain bike shoes have a pair of slots within recessed area 50 which can be used for mounting cleats. The spacing of mounting holes 14 and 64 is compatible with this standard, but may be adjusted as new industry standards develop.

When the rider wishes to disengage the pedal, the foot is rotated so that the end of groove 26 initiates depression of the spring. As the foot is further rotated, spring wires 10 and 12, or links 70 and 72 become fully expanded so that the foot may be lifted off the pedal. By varying the length of the grooves, the point at which the end of the groove initiates depression of the springs may be predetermined. The amount of rotation of the foot required to disengage the pedal can be optimized to prevent unintentional disconnection while still allowing intentional removal of the foot with minimal rotation, typically 10° to 30°. Groove length and depth are large enough to retain the connection against sudden motions of the rider's foot which are encountered, for example, when climbing hills, jumping obstacles, or when starting from a full stop, but not so great as to make disengagement of the pedal and cleat overly difficult.

While the interior of the cleats may be generally enclosed, such that a continuous ring runs around the plate, tabs 8 and 68 are configured so that openings are provided to minimize accumulation of dirt and debris within the cavity. Such accumulations present the risk of clogging the locking mechanism, and an open configuration allows the dirt and debris to pass through, or at least makes it easy to remove.

Similarly, plate 27 of pedal 22 has various openings 28 therethrough. Openings 28 permit dirt and debris to pass through the pedal to avoid build-up of material.

The materials from which the cleat and pedal are made can be any of a number of materials commonly used in the industry including durable, high-impact plastics and polymers, and various lightweight metals.

Figure 10:
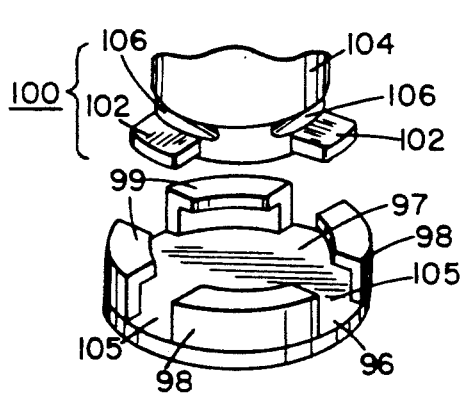
FIG. 10 is a third alternate pedal/cleat configuration.

In a third embodiment of the cleat/pedal combination illustrated in FIG. 10, the cleat comprises a plate 96 with extensions 98 (the "first extension") which form quarter plates 99 (the "second extension") parallel to plate 96 and separate therefrom by a "first height". The body 104 of pedal 100 has grooves 106 which form a neck having a second diameter, aligned in a plane parallel to plate 96 when the pedal and cleat are engaged. The body 104 has a third diameter, larger than the second diameter. Body 104 has tabs 102, either two or four in number, which are slightly narrower than the spacing 105 between quarter plates 99. The distance from one tab 102 to the diametrically opposite tab 102 is the head diameter, or "first diameter"When the rider's foot is oriented in the proper direction for riding, the tabs 102 and spacings 105 are slightly off-angle, e.g., 10° to 15°. When the rider desires to engage the pedal and the cleat, he or she rotates the foot until the tabs 102 are aligned with spacings 105 and inserts the tabs 102 into the spacings. When the foot is rotated back to its natural riding position, the tabs 102 will be retained within cavity 97 by quarter plates 99.

Other numbers of plates 99 and tabs 102, e.g., three, five or six, may be used as long as the spacing permits alignment of the tabs and spacings.

Figure 11:
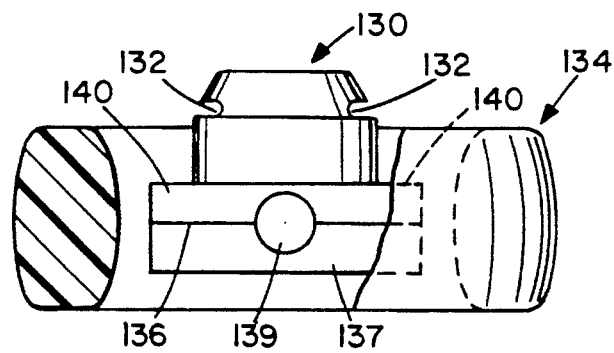
FIG. 11 is a side view, partially cut away, of an embodiment of the invention for attachment to existing mountain bike pedals.

An add-on pedal attachment is illustrated in FIG. 11. This attachment 130 permits operation identical to that of the full pedal herein above described. Grooves 132 are disposed in the upper portion of attachment 130 with means for affixing the attachment 130 to pedal 134 at the other end 136. A channel 138 fits around axle 139 of pedal 134 and is held in place by plate 137, attached by way of screws 140. This provides one-sided operation. For two-sided operation, identical attachments 130 can be bolted together around axle 139.

As illustrated in FIG. 12, the fourth embodiment of the present invention includes pedal 200 and cleat 250.

Pedal 200 consists of a solid block 202 which is symmetrical around a plane which bisects the pedal along line 204. Extending outward from each contact plane 206 is the first half of the locking mechanism of the present invention. A single extension 207 will be described since the extensions are identical on both sides of the pedal hock 202.

The extension 207 comprises a head 208 and neck 210. The head 208 is generally rectangular and is narrow in one direction when compared with the second diameter of neck 210, so that two tabs 211 and 212, which combined provide a first diameter which is wider than the neck 210, are defined which extend beyond the neck 210 in a direction parallel to the pedal spindle 214. The ends of the tabs 211 and 212 are slightly rounded, and it may be desirable to bevel the edges to facilitate engagement of the head in the corresponding rails.

The second half of the locking mechanism comprises a flat plate 252 with a width generally corresponding to the width of head 208. At each side of the plate 252 a rail 254 with an L-shaped profile extends away from the plate 252 a short distance corresponding to the thickness of head 208. For reference, the thickness of the head will also be known as the "first thickness" and the distance between the perpendicular part of the rails 254 and the plate 252 is the "first height". Rails 254 are at least as long as the narrowest dimension of head 208 and may be as long as one-half the length of the plate 252 overall so that a portion of the plate 252 has no rails. The spacing between the feet 256 of rails 254 (the "second spacing") is narrower than the width of the head 208, and the first spacing between the legs 258 (for reference, the "first extension") of rails 254 (the "second extension") is slightly larger than the width of head 208 so that head 208, when inserted into the space between the rails, can be engaged by the rails 254.

In this embodiment, the head 208 can be engaged by the rails 254 by rotating head 208 with respect to the rails to a point where the farthest distance across the head, i.e., from 260 to 262 in FIGS. 13a and 13b, will fit between the rails 254. By placing head 208 so that it contacts plate 252, hen rotating head 208 back to its normal position perpendicular to rails 254, the head 208 is held in place by the rails.

A stop 264 is provided at the front of plate 252 to prevent the head 208 from sliding out of the rails 254 at their front end. The stop 264 also provides guidance for placement of the head 208 with respect to the rails 254 before the two are engaged. Stop 264 contacts the forward most edge of neck 210. When this contact is made, a spring tab 266 located in plate 252 toward the back of the rails 254 pops outward to catch the rearmost edge of the neck 210. Spring tab 266 is depressed during the alignment step when the head 208 is not fully forward in the rails, and resiles once the force that pushes it back toward plate 252 is released. Stop 264 may also be positioned to catch the inside of neck 208, or can be made in a shape that will mate with a corresponding opening in the neck, or sone other similar variation. The key is that stop 264 provides a limit to further forward movement of the head once it has been positioned inside the rails. Similarly, spring tab 266 need not be limited to contacting the rearmost edge of the neck 210. Alternatively, spring tab 266 can resile so that it is inside the neck or mates with a corresponding opening in the neck. Also, spring tab 266 can be a resilient button, either spring loaded or made of a resilient material, such as urethane or rubber, which can be depressed then will resile once the pressure is released.

Spring tab 266 locks the head 208 within the rails 254 until the extensions 207 is rotated to a point where the tabs 211 and 212 are completely free from the rails. At this point, the extension 207 and the rails 254 can be separated to disengage the locking mechanism.

The angle of rotation for engaging and disengaging the locking mechanism is on the order of 30°, but may be varied within a range of 10 to 40 degrees according to the rider's needs. This permits a normal range of rotation of a rider's foot during pedaling without accidental release, but does not require so much rotation that it is difficult to engage or disengage the mechanism. The preferred direction of rotation is with the rider's heel pointing outward and the toe pointing inward. Nonetheless, it would be possible to set up the locking mechanism to engage or disengage when the rider's heel is rotated inward. This latter arrangement produces a greater risk of the right foot hitting the chain or chain guard.

Figure 14:
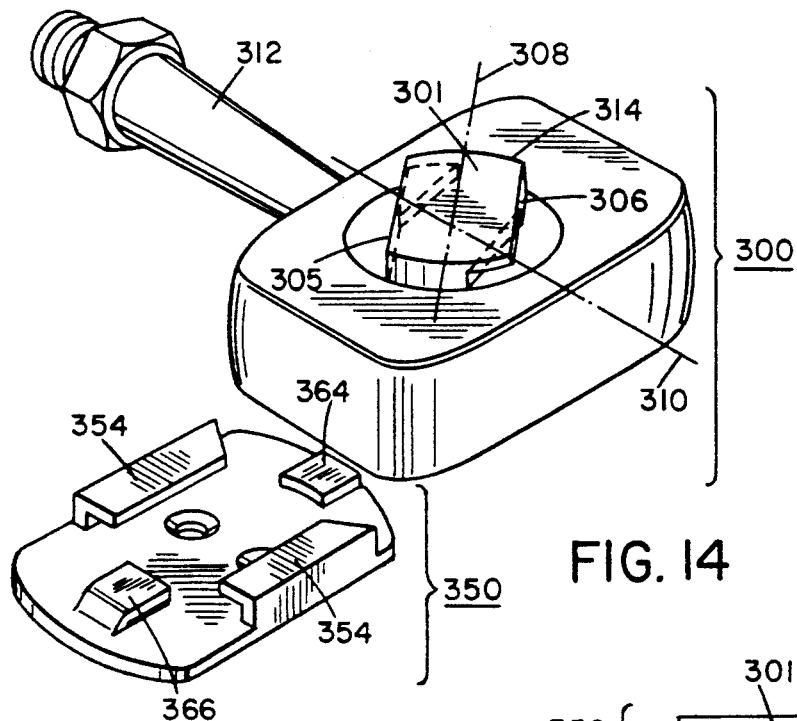
FIG. 14 is a perspective view of the locking mechanism according to a fifth embodiment.
Figure 16:
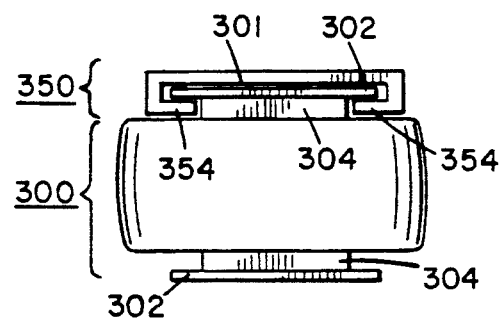
FIG. 16 is a side view of a locking mechanism according to the fifth embodiment.
Figure 15A:
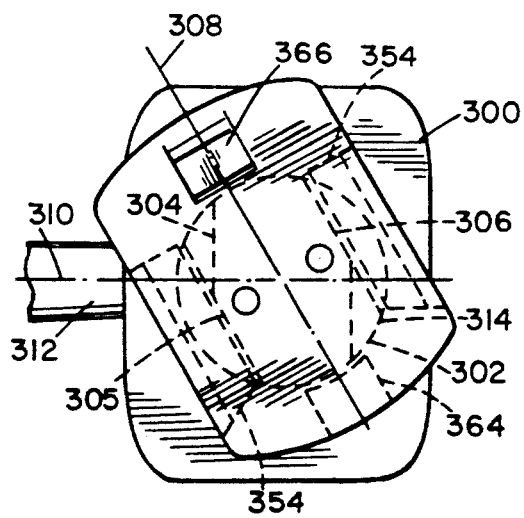
FIG. 15a is a top view of the fifth embodiment in an unlocked position and FIG. 15b is a top view in a locked position.
Figure 15B:
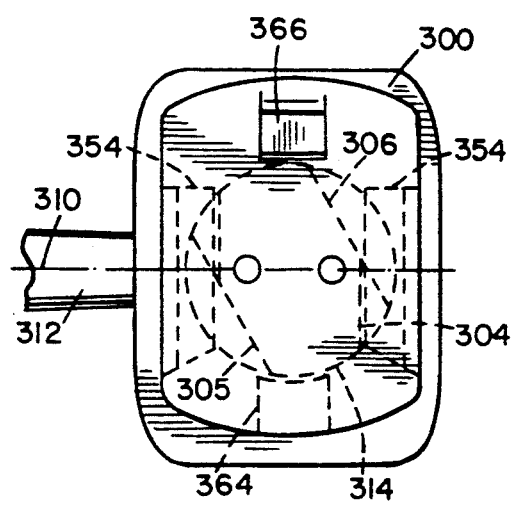

In a fifth embodiment, (FIGS. 14, 15a, 15b, and 16) the rail and plate structure are the same as above, and extension 301 of pedal 300 comprises a head 302 and a neck 304. The neck is formed by creating grooves in a generally circular base, having a second diameter at a pre-determined distance from the top of the extension to create head 302 with a given neck length corresponding to the spacing between the cleat plate of cleat 350 and the horizontal portion of the rails 354, as illustrated in FIG. 16. Head 302 has the same maximum diameter (first diameter) as the circular base, which is wider than the narrowest spacing between the rails 354, but narrower than the widest spacing between the rails 354. Head 302 is flattened on two sides 305 and 306 which are on opposite sides of a line 308 running along the first maximum diameter of head 302, to create a rectangle with curved ends and a length of the maximum diameter. The distance between sides 305 and 306 is slightly less than the narrowest spacing between rails 354. The portion of the head 302 which overhangs the neck 304, and which will be captured within the rails 354, is illustrated in FIGS. 14, 15a and 15b as being opposing corners of the generally rectangular head. The undercut portion of the neck 304 need not be limited to the corners illustrated, but can extend completely around the extension or some portion thereof. For normal rotation of the foot during pedalling, it is desirable to extend the groove at least a short distance in both directions beyond the corners illustrated, to permit a small amount of rotation in both directions without releasing the connection. This will minimize strain on the rider's knees.

The orientation of head 302 is such that line 308 is at an angle of approximately 60° to a line 310 running through spindle 312, shown in FIG. 15b. In order to engage head 302 within rails 354 the rails and plate structure is rotated 30° with respect to the rails 354. The orientation of the head can be varied to provide a range of rotation to disengage, as in the above embodiments. In this rotated position, the head 302 will be parallel to and may be placed between rails 354. Rotation back to the normal orientation (with the rider's foot generally perpendicular to the pedal spindle) will capture the head 302 within the rails 354. As in the fourth embodiment, if the head 302 is not fully forward it must be slid forward until it contacts stop 364. At this point of contact, spring tab 366 will pop up to catch and hold the rearmost edge of extension 301.

An alternate means for engaging the locking mechanism according to the fifth embodiment is to bring the leading edge 314 of extension 301 into contact with plate 352 at the rearmost end of rails 354, then sliding the extension straight forward, catching head 302 within rails 354, as in FIG. 15b.

Stop 364 will halt further forward movement when the head 302 is properly located and spring tab 366 will resile to capture the rearmost edge of extension 301.

For release of the locking mechanism, one of the extension 301 and the rails 354 are rotated so that they are approximately 30°, or some other pre-selected angle, with respect to each other. This will align the head 302 to be parallel with the rails, as in FIG. 15a, so that extension 301 and rails 354 can be separated.

While the above embodiments are described in terms of the extension being attached to the pedal and the rails attached to the cleat which attaches to the rider's shoes, the two halves of the locking mechanism can be reversed, with the rails 454, stop 464 and spring tab 466 on both sides of the pedal 400 and the extension 401 attached to a cleat plate 458 attached to the rider's shoe, as illustrated in FIG. 17. The common elements of each embodiment, and an important aspect of the invention, is the simple, symmetrical head on the extension with a groove or indentation thereunder which can be captured, either under a set of laterally projecting rails or other lateral protrusions, and can be released by rotation of the extension with respect to the lateral protrusion to remove the head from under the lateral protrusion.

The above described embodiments of the pedal locking mechanism provide lightweight and readily manufactured means for releasably engaging a rider's foot with a bicycle pedal when compared with the relatively complex mechanisms that are currently available. The simplicity of the locking mechanism greatly decreased susceptibility to failure resulting from dirt build-up within the mechanism. Further, while the above embodiments have been described in their applicability to mountain bike pedals, such mechanisms could easily be incorporated in a clipless pedal system for any other type of bicycle, and can, in fact, be used for a number of applications where releasable attachment is required, unrelated to bicycle pedals, or even bicycles. In the engaged position, a firm lock is maintained to prevent separation while still permitting a limited amount of rotation, if desired. To disengage, one-half of the locking mechanism rotated with respect to the other half to some pre-determined angle until the head can be separated from the rails.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A locking mechanism for a clipless pedal system having a pedal and a cleat for attachment to a rider's shoe, said locking mechanism comprising:
  a body having a lower end for attachment to a first surface and an upper end with a head portion disposed on top of a neck portion, said head portion having at least one head diameter and a head thickness and said neck portion having a plurality of diameters with at least one neck diameter smaller than said head diameter, and a third diameter below said neck portion, said neck portion having a neck length at a location corresponding to said neck diameter; and
  at least two engaging means disposed on a second surface, each engaging means comprising:
    at least one first extension affixed perpendicular to said second surface with a first spacing between said first extension of one said engaging means and said first extension of another said engaging means, said first spacing being greater than said head diameter of said head;
    a second extension affixed perpendicular to said first extension at a first height above and parallel to said second surface with a second spacing between said second extension of one said engaging means and said second extension of the other said engaging means, said second spacing being smaller than said first spacing, said head diameter and said third diameter, and larger than said neck diameter, and said head thickness being smaller than said first height;
  wherein placement of said two engaging means at a first angle relative to said neck diameter of said neck portion causes said body and said engaging means to be releasably locked together and rotation of said two engaging means relative to said second diameter to a second angle different from said first angle causes said body and said engaging means to be releasable from each other.

2. A locking mechanism as in claim 1 wherein said first surface lies generally within a contact plane of said pedal wherein said body is affixed at a lateral center of said contact plane and said second surface is a cleat plate for attachment to said rider's shoe.

3. A locking mechanism as in claim 2 wherein a second body is affixed to said pedal on a second contact plane on a side of said pedal opposite said body.

4. A locking mechanism as in claim 1 wherein said two engaging means comprise L-shaped rails and further comprising:
   a stop disposed at a rearward end of said second surface to prevent forward movement of said head portion at a predetermined limit while engaged in said L-shaped rails; and
   a resilient protrusion disposed at a forward end of said second surface at a distance from said stop slightly larger than said third diameter, said resilient protrusion being depressed to permit forward movement of said head portion until reaching said predetermined limit and resiling when a forward portion of said head strikes said stop to catch a rear portion of said body, thereby locking said body in place.

5. A locking mechanism as in claim 1 wherein said two engaging means comprise two spring wires and means for supporting said two spring wires.

6. A locking mechanism as in claim 1 wherein said two engaging means comprise two spring-loaded wires and means for supporting said two spring wires.

7. A locking mechanism as in claim 4 wherein said head portion comprises a generally narrow rectangle having a length of said first diameter, said length being perpendicular to said two rails in a locked position.

8. A locking mechanism as in claim 4 wherein said head portion comprises a rectangle having a head length of said first diameter and a head width smaller than said second spacing, said rectangle being disposed at an angle to a line across said second diameter of said neck whereby two opposing corners of said head are engaged within said L-shaped rails.

9. A locking mechanism as in claim 1 wherein said first surface is a cleat plate for attachment to a rider's shoe and said second surface is a contact plane of said pedal.

10. A locking mechanism as in claim 9 wherein a second set of said two engaging means are affixed to a second contact plane on a bottom of said pedal.

11. A locking mechanism for releasably attaching a first surface comprising one of a bicycle pedal or a sole of a bicycle shoe to a second surface comprising the other, said locking mechanism comprising:
   a body affixed to said first surface and a head portion and neck portion, said head portion having at least a first diameter and a first thickness and said neck portion having at least one second diameter smaller than said first diameter and a third diameter, said neck portion having a first length at a location corresponding to said second diameter; and
   at least two engaging means disposed on said second surface, each engaging means comprising:
      at least one first extension perpendicular to said second surface with a first spacing between said first extension of another said engaging means, said first spacing being greater than said first diameter of said head portion; and
      a second extension perpendicular to said first extension at a first height above and parallel to said second surface with a second spacing between said second extension of one said engaging means and said second extension of another said engaging means, said second spacing being smaller than said first spacing, said first diameter and said third diameter, and larger than said second diameter, said second extension having a second thickness smaller than said first length of said neck portion and said first thickness being smaller than said first height;
   wherein placement of said first surface at a first angle relative to said second surface causes said head portion to be locked within aid engaging means and rotation of said first surface to a second angle opposite said first angle causes said head portion to be released from said engaging means.

12. A locking mechanism as in claim 11 wherein said two engaging means comprise L-shaped rails and further comprising:
   a stop disposed at a rearward end of said flat surface to prevent forward movement of said head portion at a predetermined limit while engaged in said L-shaped rails; and
   a resilient protrusion disposed at a forward end of said flat surface at a distance from said stop slightly larger than said third diameter, said resilient protrusion being depressed to permit forward movement of said head portion until reaching said predetermined limit and resiling when a front portion of said head portion strikes said stop to catch a rear portion of said body, thereby locking said body in place.

13. A locking mechanism as in claim 11 wherein said two engaging means comprise two spring wires and means for supporting said two spring wires.

14. A locking mechanism as in claim 11 wherein said two engaging means comprise two spring-loaded wires and means for supporting said two spring-loaded wires.

15. A locking mechanism as in claim 12 wherein said head portion comprises a generally narrow rectangle having a length of said first diameter, said length being perpendicular to said two rails in a locked position.

16. A locking mechanism as in claim 12 wherein said head comprises a rectangle having a length of said first diameter and a width smaller than said second spacing said rectangle being disposed at an angle to said second diameter of said neck whereby two opposing corners of said head portion are engaged within said L-shaped rails.

17. A locking mechanism as in claim 11 wherein said first surface is a bicycle pedal and a second surface is a sole of a bicycling shoe.

18. A locking mechanism as in claim 11 wherein said first surface is a sole of a bicycling shoe and said second surface is a bicycle pedal.

19. A locking mechanism as in claim 18 wherein said body is affixed at a lateral center of said pedal and said two engaging means are affixed to a cleat plate for attachment to said rider's shoe.

20. A locking mechanism as in claim 19 wherein a second body is affixed to said pedal on a side of said pedal opposite said body.

* * * * *